United States Patent [19]
Samant et al.

[11] Patent Number: 6,061,115
[45] Date of Patent: May 9, 2000

[54] METHOD OF PRODUCING A MULTI-DOMAIN ALIGNMENT LAYER BY BOMBARDING IONS OF NORMAL INCIDENCE

[75] Inventors: Mahesh Govind Samant, San Jose; Joachim Stöhr, Woodside, both of Calif.

[73] Assignee: International Business Machines Incorporation, Armonk, N.Y.

[21] Appl. No.: 09/185,234

[22] Filed: Nov. 3, 1998

[51] Int. Cl.[7] .............................. G02F 1/1337; C07C 1/00
[52] U.S. Cl. ...................... 349/129; 349/124; 204/157.15
[58] Field of Search ...................... 204/157.15; 349/124, 349/127, 129

[56] References Cited

U.S. PATENT DOCUMENTS

| | | | |
|---|---|---|---|
| 4,153,529 | 5/1979 | Little et al. .......................... 204/192.3 |
| 4,526,818 | 7/1985 | Hoshikawa et al. ........................ 428/1 |
| 4,568,833 | 2/1986 | Roelofs .................................... 250/398 |
| 4,683,378 | 7/1987 | Shimase et al. ...................... 250/492.2 |
| 4,785,188 | 11/1988 | Mori et al. ............................ 250/492.2 |
| 4,939,360 | 7/1990 | Sakai ...................................... 250/398 |
| 5,030,322 | 7/1991 | Shimada ................................... 216/23 |
| 5,065,034 | 11/1991 | Kawanami et al. ................. 250/492.2 |
| 5,151,605 | 9/1992 | Politiek et al. ...................... 250/492.2 |
| 5,309,264 | 5/1994 | Lien et al. .............................. 349/143 |
| 5,384,650 | 1/1995 | TeKolste et al. ...................... 349/130 |
| 5,410,422 | 4/1995 | Bos ......................................... 349/117 |
| 5,424,244 | 6/1995 | Zhang et al. ............................ 438/301 |
| 5,479,282 | 12/1995 | Toko et al. .............................. 349/123 |
| 5,508,832 | 4/1996 | Shimada .................................. 349/189 |
| 5,550,662 | 8/1996 | Bos ......................................... 349/117 |
| 5,576,862 | 11/1996 | Sugiyama et al. ........................ 359/75 |
| 5,604,615 | 2/1997 | Iwagoe et al. .......................... 349/124 |
| 5,608,556 | 3/1997 | Koma ........................................ 349/42 |
| 5,633,194 | 5/1997 | Selvakumar et al. ................... 117/103 |
| 5,657,105 | 8/1997 | McCartney ............................. 349/157 |
| 5,661,366 | 8/1997 | Hirota et al. ........................... 315/541 |
| 5,717,474 | 2/1998 | Sarma ...................................... 349/85 |
| 5,721,600 | 2/1998 | Sumiyoshi et al. ..................... 349/119 |
| 5,757,455 | 5/1998 | Sugiyama et al. ...................... 349/129 |
| 5,770,826 | 6/1998 | Chaudhari et al. ................ 204/157.15 |
| 5,855,968 | 1/1999 | Hirata et al. ............................ 427/533 |

OTHER PUBLICATIONS

Jérôme (1991), "Surface Effects and Anchoring in Liquid Crystals," *Rep. Prog. Phys.* 54:391–451 (Abstract).

Koike et al. (1992), "A Full–Color TFT–LCD with a Domain–Divided Twisted–Nematic Structure," *SID 92 Digest*, 23:798–801.

Lee et al. (1997), "Microscopic Molecular Re–Orientation of Polymer Surfaces Induced by Rubbing and Factors Determining LC Pretilt Angles," *Polymer Surfaces and Interfaces: Characterization, Modification and Application*, pp. 295–315.

Lien et al. (1995) "UV Modification of Surface Pretilt of Alignment Layers for Multidomain Liquid Crystal Displays," *Appl. Phys. Lett.*, 67(21):3108–3110.

Okamoto (1998), "MVA Liquid Crystal Technology—Latest Version of VA Liquid Crystals," *Nikkei Flat Panel Display*, pp. 104–107.

*Primary Examiner*—William L. Sikes
*Assistant Examiner*—Heidi L. Eisenhut
*Attorney, Agent, or Firm*—Dianne E. Reed; Reed & Associates

[57] ABSTRACT

Methods for producing a multi-domain alignment layer, as well as the multi-domain alignment layers produced thereby and liquid crystal displays comprising the same, are provided. In the subject methods, a surface of an alignment film, usually present on a substrate such a planar component of a polarized material, is bombarded with ions initially at normal incidence in the presence of an electric field in a manner sufficient such that the ions contact the surface of the alignment film at non-normal incidence. In a preferred embodiment, the electric field is produced by an array of conducting means associated with the surface of the alignment film, at least two of which means are differentially biased, e.g. alternately biased. The resultant alignment layers find use in liquid crystal display devices.

17 Claims, 3 Drawing Sheets

SINGLE PIXEL CONSISTING OF FOUR DOMAINS

METHOD OF PRODUCING A MULTI-DOMAIN ALIGNMENT LAYER BY BOMBARDING IONS OF NORMAL INCIDENCE

TECHNICAL FIELD

The field of this invention is liquid crystal displays.

BACKGROUND OF THE INVENTION

Liquid crystal displays find use in a variety of different applications, such as data displays in watches, calculators and the like, as well as in flat panel displays found in laptop or notebook computers. Liquid crystal displays offer many advantages over alternative technologies, e.g. cathode ray tube based displays, where such advantages include: low power consumption, small size, light weight, and the like. As such, it is believed by many that liquid crystal displays will find wide-spread use in an even larger number of different applications than those in which they currently find use, where it is envisioned that liquid crystal displays will eventually become standard features in desktop computer monitors, televisions, etc.

In typical flat panel displays currently found in many laptop computers, the picture on the screen of the display is composed of many pixels whose size depends on the product. For example, the current 12.1 inch SVGA displays have pixels of approximately 300×300 $\mu$m in size. In each pixel the desired color is created by "mixing" blue, green and red primary colors of different intensities by means of having patterned color filters of these three colors on separate electrodes. The intensity of each color is adjusted by using liquid crystals to change the light intensity transmitted from the back to the front of the display. The liquid crystal (LC) is composed of rod-like molecules that tend to keep their long axis aligned due to intermolecular forces. The LC is filled into the gap, a few microns wide, between two polyimide films coated onto indium-tin-oxide electrodes which, in turn, are deposited onto two glass-plate polarizers. In order for the display to work, the LC molecules have to be anchored down nearly parallel to the surfaces of the polyimide films but on opposite sides point into the perpendicular directions of the two crossed polarizers. The LC molecules thus form a twisted helix from one side to the other. When light from a light source in the back of the display crosses the first polarizer it is polarized along the long axis of the LC molecules anchored to it. As the light progresses through the LC, the helical LC structure changes the polarization of the light from linear to elliptical so that only part of the light is transmitted by the second, perpendicular polarizer. Since the light transmission depends on the orientation of the LC rods it can be changed by rotation of the long axis of the LC rods. This is accomplished by application of a small voltage to each color cell within all pixels by means of microscopic indium tin oxide (ITO) electrodes independently driven by a transistor array. As the voltage is increased, the LC long axis becomes increasingly parallel to the electric field direction, which is parallel to the light transmission direction. The light polarization becomes less affected by the LC and the light transmission is reduced because of the crossed polarizers.

A display is said to be "single domain" if the LC molecules have a single pre-tilt angle along one azimuthal direction of the surface plane (i.e. the long axis of the LC molecules is orientated along in-plane direction and tilted up from that direction by a well defined angle which, in the case of current 12.1 inch SVGA displays, is a few degrees) and hence long axes of all LC molecules appear more or less parallel to each other over the whole display. A multi-domain display contains at least two differently oriented single domain regions such that the two or more single domain regions form a color sub-pixel of the display. A drawback of many currently employed single-domain liquid crystal displays is that such devices are characterized by having a narrow or limited viewing angle. As such, a number of different methods have been developed for producing multi-domain liquid crystal displays. Such methods include the mask rubbing two domain method (JP-106624), the fringe field two domain method (U.S. Pat. No. 5,309,264), the double alignment layer two domain method (Koide et al., SID 92 Dig. (1992) 798) and the UV treatment two domain method (Lien et al., Appl. Phys. Lett. (1995) 67:3108). Yet another approach to improving the viewing angle of liquid crystal displays has been to employ a textured alignment layer. See Nikkei, Flat Panel Display (1998) 104 to 107.

Despite the development of the above methods for producing multi-domain liquid crystal displays, there continues to be an interest in the development of new methods of producing multi-domain displays with broad viewing angles. Ideally, such methods should have a minimal number of steps, be efficient and be adaptable to clean-room high throughput manufacturing.

Relevant Literature

U.S. Pat. Nos. 5,757,455; 5,721,600; 5,717,474; 5,657,105; 5,608,556; 5,576,862; 5,550,662; 5,508,832; 5,479,282; 5,410,422; 5,309,264 describe multi-domain liquid crystal displays.

SUMMARY OF THE INVENTION

Methods for producing alignment layers, as well as the alignment layers produced thereby and liquid crystal display devices incorporating the same, are provided. In the subject methods, an alignment layer is produced on the surface of a substrate by bombarding an alignment film on the substrate surface with ions of initial normal incidence, i.e. vertically incident ions. Bombardment of the alignment film occurs in the presence of an electric field that changes the trajectory of the initially normal incident ions such that the ions contact the surface of the film at non-normal incidence. In preferred embodiments, the electric field is produced by an array of conducting means associated with the alignment film during ion bombardment, where at least two of the conducting means are differentially biased, e.g. alternately biased. The alignment layers produced by the subject methods find use in liquid crystal display devices.

DESCRIPTION OF THE SPECIFIC EMBODIMENTS

Figure 1:
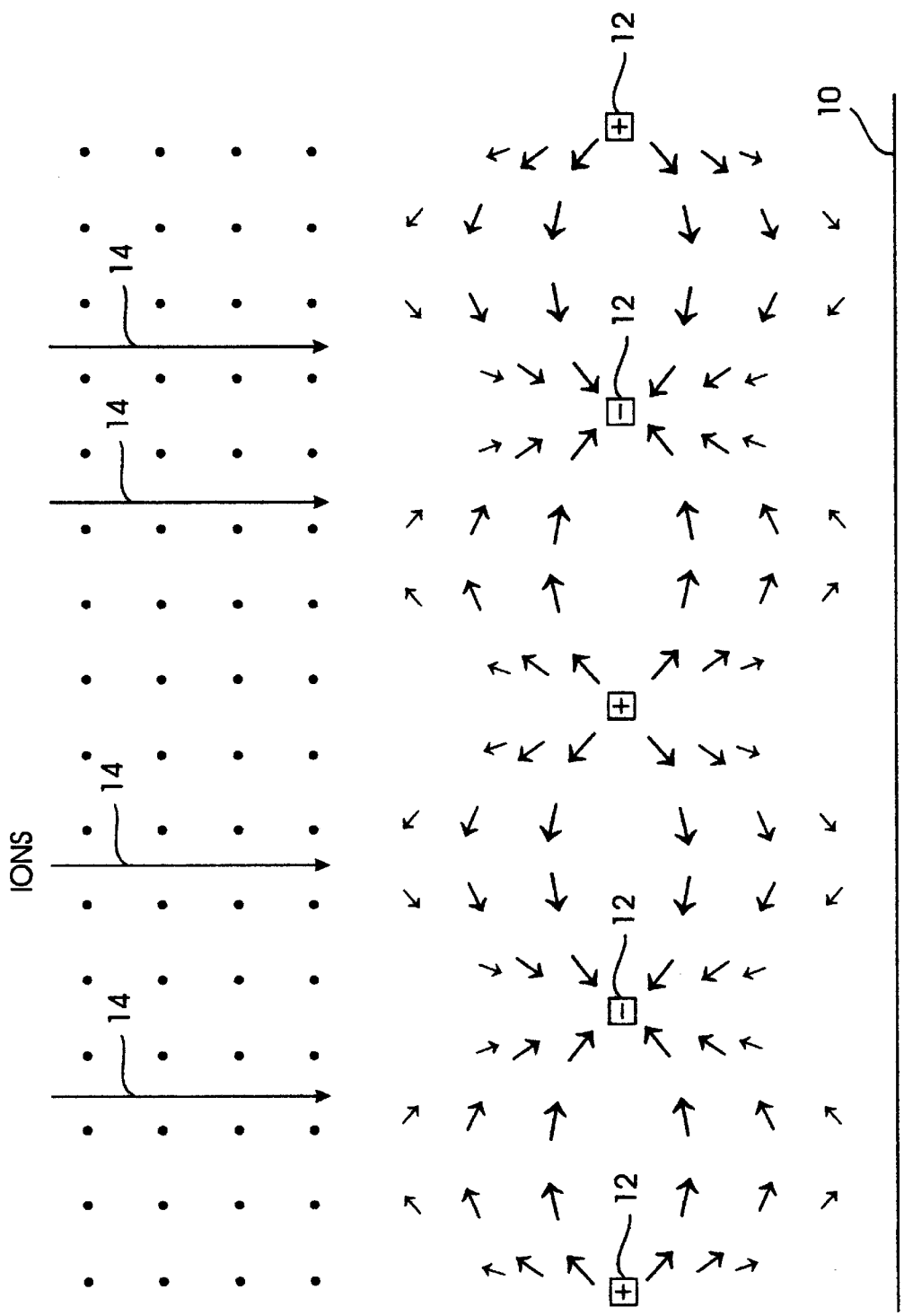
FIG. 1 provides a side view representation of the electric field produced by an array of alternately biased wires positioned above an alignment film during ion bombardment according to the methods of the subject invention.

Methods are provided for producing multi-domain alignment layers for use in liquid crystal display devices. In the subject methods, an alignment film on the surface of a substrate is bombarded with ions that are initially at normal incidence with respect to the surface. An electric field is positioned relative to the film such that the ions actually contact the film at a non-normal incidence. The electric field is preferably produced by an array of conducting means having at least two means of different bias. The resultant alignment layers find use in multi-domain liquid crystal displays.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an" and "the" include plural reference unless the context clearly dictates otherwise. Unless defined otherwise, all technical and scientific terms used herein have the same meaning as commonly understood to one of ordinary skill in the art to which this invention belongs.

In the methods of the subject invention, an alignment film on the surface of a substrate is bombarded with ions in a manner sufficient to induce bond anisotropy in the film (at least in the upper strata or layers of the film) and, as such, an alignment layer on the substrate surface, where the alignment layer is a multi-domain alignment layer in that it has domains which have LC molecules with different pre-tilt directions. The substrate on which the alignment film is positioned may be fabricated from a variety of materials, usually polarized materials, including glasses, plastics, etc, where such materials suitable for use as substrates in liquid crystal display devices are known in the art. The substrate may or may not be optically transparent, depending on the nature of the device into which it is to be incorporated, e.g. the substrate may be reflective. The overall dimensions of the substrate will vary widely depending the intended use of the display fabricated therefrom, but will generally have a length that ranges from about 1 cm to 200 cm, and a width that ranges from about 1 cm to 200 cm.

Layered on the surface of the substrate is an alignment film. The alignment film may be any material that can be bombarded with ions to induce anisotropy in the surface strata of the material such that the bond orientations at the surface of the film show in-plane asymmetry in a single direction but with out of surface asymmetry in at least two directions to yield multi-domain alignment. The alignment film may range in thickness from about 2 to 10,000 Å, usually from about 5 to 1,000 Å and more usually from about 10 to 100 Å. Suitable materials are insulating, optically transparent, particularly in the visible range, and may be materials that are produced by either wet processes or dry processes, where dry processed materials are preferred. Wet process alignment materials or films that find use include polyimide films, and the like, where such materials, as well as methods for their deposition on the surface of a transparent planar component, are known to those of skill in the art.

Dry process materials finding use as alignment films on the surface of the substrate are materials that are optically transparent and amorphous or fine-grained, where by "amorphous" is meant that the atomic structure of the material has no preferred direction or orientation. Suitable materials are also characterized by exhibiting ionic or partially ionic, covalent or partially covalent bonding. Dry process materials finding use include: hydrogenated diamond-like carbon (DLC), amorphous carbon, amorphous hydrogenated silicon, SiC, $SiO_2$, glass, $Si_3N_4$, $CeO_2$, $SnO_2$, $ZnTiO_2$, and the like. In many preferred embodiments, the alignment film comprises hydrogenated DLC. The preparation of such alignment films on the surface of substrates, including films of hydrogenated DLC, is described in U.S. patent application Ser. No. 09/028,018 filed Feb. 23, 1998 (IBM ref: YO997-383), the disclosure of which is herein incorporated by reference.

Positioned between the substrate and the alignment film may be a metal oxide film which serves to set up voltage across the cell of a liquid crystal display produced therefrom. The metal oxide film may be arranged in rows and columns (as found in passive matrix displays) or patterned as the individual pixels of an active matrix display. Metal oxides from which this film may be fabricated include: indium tin oxide and the like, where the preparation of such layers is known to those of skill in the art.

In order to produce an alignment layer from the alignment film present on the substrate surface, the alignment film is bombarded with ions. By "bombarding" is meant that the surface of the alignment film is exposed or irradiated to a particle beam consisting of atoms, molecules, or clusters with neutral or ionic charge. The ion beam may be generated in an ion beam generating device from a gas, where such devices are known to those of skill in the art. See U.S. Pat. Nos. 5,661,366, 5,151,605; 5,149; 5,065,034; 4,939,360; 4,785,188; 4,683,378; 4,568,833, the disclosures of which are herein incorporated by reference. A representative ion beam generating device is disclosed in U.S. patent application Ser. No. 09/028,018 filed Feb. 23, 1998 (IBM Ref: YO997-383), the disclosure of which is herein incorporated by reference. The ion beam may be generated from a number of different gases, where such gases include: noble or inert gases, such as helium (He), argon (Ar), neon (Ne), krypton (Kr) or xenon (Xe); an admixture of a noble gas with an active gas, such as nitrogen, fluorine, a fluorocarbon, or a hydrocarbon; nitrogen; oxygen; or combinations thereof. The energy of the ion beam will be at least about 5 to 500 eV, usually at least about 10 to 200 eV and more usually at least about 20 to 100 eV, where the energy value of the ion beam will not exceed about 1000 eV and usually will not exceed about 500 eV.

The ion beam will be directed at the surface of the alignment film at normal or vertical incidence; i.e. the direction of the ion beam will be perpendicular to the alignment film surface. In other words, the alignment film will be bombarded with a normal incident ion beam. A device and protocol suitable for generating an ion beam at normal incidence to the surface of an alignment film on a substrate surface is shown in FIG. 1 of U.S. patent application Ser. No. 08/644,788 filed May 10, 1996 (IBM Ref: YO996-070) the disclosure of which is herein incorporated by reference.

During ion beam bombardment, an electric field is associated with the alignment film surface, e.g. positioned between the ion beam source and the alignment film surface. The electric field is generated such that the ions in the particle beam change direction from their normal incidence trajectory and contact the surface of the alignment film at a non-normal incidence. To achieve a reliable multi-domain, the flux of neutral species that impact the alignment layer is preferably minimized. The electric field is preferably generated by an array of parallel conducting means, e.g. stripes or wires of a conducting material, such as aluminum, copper, aluminum copper alloy, indium tin oxide and the like. During ion bombardment, the array will be associated with the alignment layer surface in a manner sufficient to produce the electric field necessary for redirecting the ions of the particle beam from their initial, normal trajectory. As such, the array may be incorporated into the alignment film, positioned below the alignment film, positioned on the surface of the alignment film as a non-removable component or positioned above the alignment film. This array can also be a removable mask. As such, the array can be a part of a panel plate which is made up of the alignment layer and the substrate, among other components, where the array may be embedded in the film, on the surface of the film, or below the film but is not separated from the panel plate which is made up of the alignment film and the substrate. Alternatively, the array may be separate from the panel plate comprising the alignment film and substrate, such that the array can be moved into and out of position relative to the alignment film, e.g. into and out of a position above the alignment film. Where the array is a removable mask positioned above the alignment film, the method further includes the step of placing the array above the alignment film surface. The appropriate bias is then applied to the conducting means of the array prior to ion beam irradiation and this bias is then maintained during the irradiation step.

As mentioned above, the array comprises a plurality of parallel conducting means, where the actual number of conducting means, e.g. stripes or wires, in the array will necessarily vary depending on the particular device being fabricated, where the total number of conducting means in the array depends on pixel size and the size of the display being manufactured. The spacing between any two parallel conducting means in the array will range from about 5 to 300 microns, usually from about 20 to 150 microns and more usually from about 40 to 150 microns. The width or diameter of any given conducting means in the array will generally range from about 0.1 to 30 microns, usually from about 1 to 10 microns.

In generating the electric field with the array, at least two of the conducting means are differentially biased, by which is meant that the voltage applied to one of the conducting means is different from that which is applied to at least one other of the conducting means. In preferred embodiments, two different voltages are applied to the conducting means of the array, where the resultant bias differs from one means to another in the array in an alternating fashion. For example, in an array of 20 conducting means, a first voltage will be applied to the odd numbered means and a second voltage will be applied to the even numbered means to produce an array of wires of alternating bias. The manner in which the bias differs may vary. Thus, in certain embodiments where a portion of the conducting means are positively charged, the remainder of the conducting means may be at ground, negatively biased or less positively biased. Any particular configuration may be employed so long as an electric field can be generated with the array that is sufficient to deflect the ions from their initial normal incidence trajectory so that they contact the alignment film surface at a non-normal incidence. The voltage applied to the individual conducting means is determined by the kinetic energy of the incident ion beam and the spacing between the adjacent conducting means. However, if this voltage exceeds the nominal energy of the incident ions then a fraction of these ions will be repelled away from the surface. The voltage applied to the individual conducting means of the array may vary, but will generally be between about −1000 V and +1000V, usually between about −200 V and +200 V and more usually between about −100 V to +100 V.

To produce the alignment layer, the alignment film will be irradiated or exposed to the incident ion beam in the presence of the electric field for a period of time sufficient to produce the desired anisotropic atomic arrangement on the film surface. The period of time during which the film is exposed to the ion beam depends on the ion beam energy and the ion flux. Typical ion beam dose will generally range from about $1\times10^{14}$ to $1\times10^{18}$ ions/cm$^2$, usually from about $10^{15}$ to $10^{17}$ ions/cm$^2$ and more usually from about $5\times10^{15}$ to $5\times10^{16}$ ions/cm$^2$.

As a result of the process by which it is fabricated, the resultant alignment layer is characterized by an anisotropic surface in which there are at least two different regions, usually a plurality of different regions, that differ from each other in terms of the distribution of the out-of-plane bonds at the surface i.e. each region comprises an out-of-plane distribution of bonds which is asymmetric with respect to the surface normal and this asymmetric distribution differs for adjacent regions on the alignment film surface. The pattern of different alignment regions will typically be in the form of stripes spread across the surface of the alignment layer, where the asymmetric out-of-plane bond distribution in any two given adjacent stripe regions will be either pointing away from each other (i.e. opposite) or pointing towards each other. Between any two stripe regions in which the alignment direction is opposite, i.e. in which the bond alignment directions point away from each other, there will typically be a narrow dividing region in the alignment layer of substantially no alignment, where the width of this narrow dividing region will typically not exceed about 50 microns, usually will not exceed about 20 microns and more usually will not exceed about 10 microns. Since the alignment layers produced by the subject invention are made up of at least two different asymmetric out-of-plane bond distributions, they are multi-domain alignment layers. Preferably, the alignment layers are produced such that in each color cell within a pixel region of the alignment layer, there are two alignment regions, where the directions of the two alignment regions point towards each other or away from each other. The alignment layers produced by the subject methods are further characterized by being able to align liquid crystals with a pre-tilt angle, where this pre-tilt angle ranges from about 0 to 15 degree, usually from about 1 to 6 degrees.

The resultant alignment layers find use in the fabrication of liquid crystal devices, particularly for use in flat panel displays. The production of liquid crystal devices from suitable substrates having an appropriately aligned surface is well known in the art. Generally, two substrates having an aligned surface are positioned relative to each other such that the aligned surfaces face each other and the direction of alignment of one surface is perpendicular to the direction of alignment in the other surface. With alignment layers produced according to the present invention, the direction of the alignment layer of one substrate will be positioned relative to the direction of the alignment layer of the other substrate such that one achieves four different regions or domains for every color cell of any given pixel, e.g. two right handed domains and two left handed domains. Spacer means, e.g. spacer balls, capable of maintaining a space between the two substrates, e.g. from about 2 to 10 μm, usually about 5 μm, are then positioned between the substrates. Liquid crystal is then introduced into the space between the plates. A variety of different suitable liquid crystals are known to those of skill in the art. See Jérôme, "Surface Effects and Anchoring in Liquid Crystals," Rep. Prog. Phys. (1991) 54:391–451;

see also Lee et al., *Microscopic Molecular Re-orientation of Polymer Surfaces Induced by Rubbing and Factors Determining LC Pretilt Angles*, in POLYMER SURFACES AND INTERFACES: CHARACTERIZATION, MODIFICATION AND APPLICATION (1997) pp 1997. The interior space comprising the liquid crystals is then sealed from the environment to produce a liquid crystal display device. The resultant liquid crystal display device finds use in a variety of different applications, including as a flat panel display in laptop computers, as a flat panel display for desktop monitors, as a flat panel display for television viewing, and the like.

The following examples are offered by way of illustration and not by way of limitation.

EXPERIMENTAL

A. Production of substrate with alignment film on its surface.

A glass substrate having an alignment film on its surface is prepared. The alignment film is hydrogenated diamond like carbon (DLC) and is prepared by the method described in U.S. patent application Ser. No. 09/028,018 filed Feb. 23, 1998 (IBM Ref: YO997-383), the disclosure of which is herein incorporated by reference.

B. Ion Bombardment of Alignment Film

As shown in FIG. 1, an array of parallel 4 μm wires 12 of a suitable conducting material in which the spacing between each wire is 40μ is placed above the alignment film 10 produced in A above. The wires are alternately biased at either +25 V or −25 V and produce an electric field above the alignment film surface, where the small arrows show the direction of the electric field. In the presence of the electric field, the alignment film is then bombarded for 1 min. with vertically incident (i.e. normally incident) Ar+ ions of 75 eV energy, represented by long arrows 14, using the device disclosed in FIG. 1 of U.S. application Ser. No. 08/644,788 filed May 10, 1996 (IBM Ref: YO-996-070) the disclosure of which is herein incorporated by reference.

Figure 2:
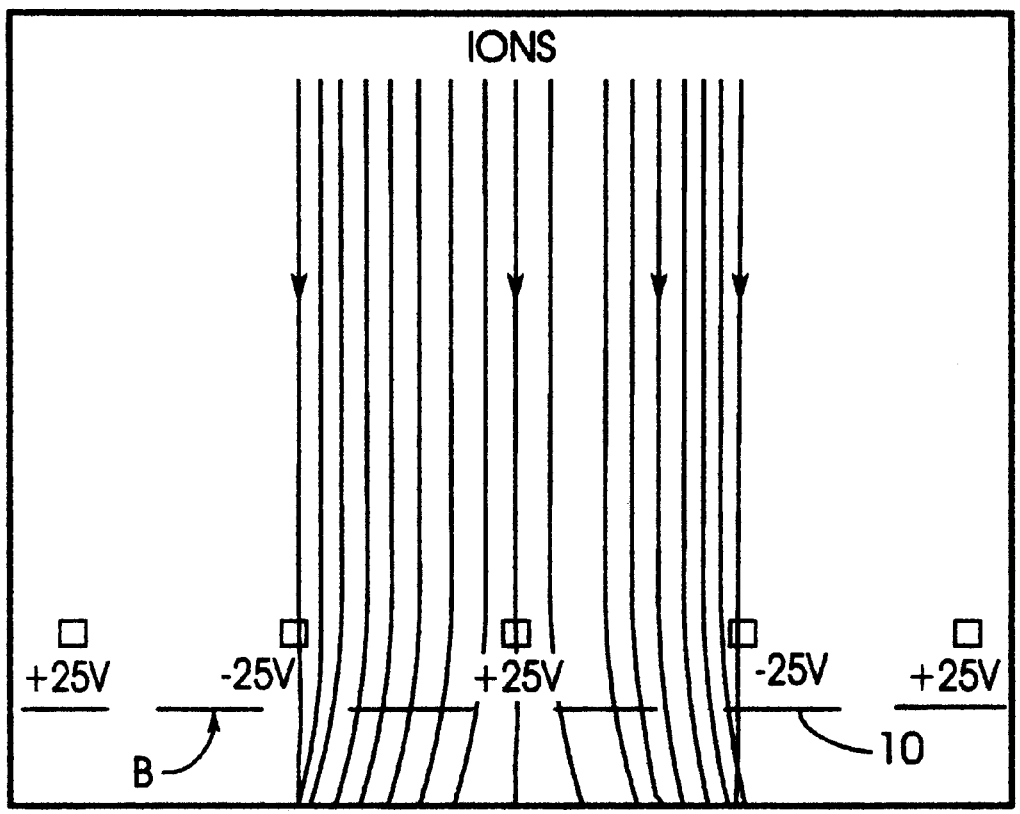
FIG. 2 provides a side view representation of the trajectories of initially normally incident ions as they approach the surface of an alignment film according to the subject invention.

FIG. 2 shows the trajectories of the Ar+ions as they contact the alignment film surface 10. As shown in FIG. 2, the trajectories of the initially normal or vertically incident Ar+ ions are altered as the ions approach the electric field such that the ions contact the alignment film surface 10 at non-normal incidence. When a liquid crystal is placed on the resultant alignment layer, the liquid crystal molecules align nearly parallel with the surface and perpendicular to the wires of the array, but is tilted up slightly in different directions on either side of the wire such that the liquid crystal pre-tilts towards the positively biased wire on each side of the wire.

C. Preparation of Flat Panel Display

Figure 3:
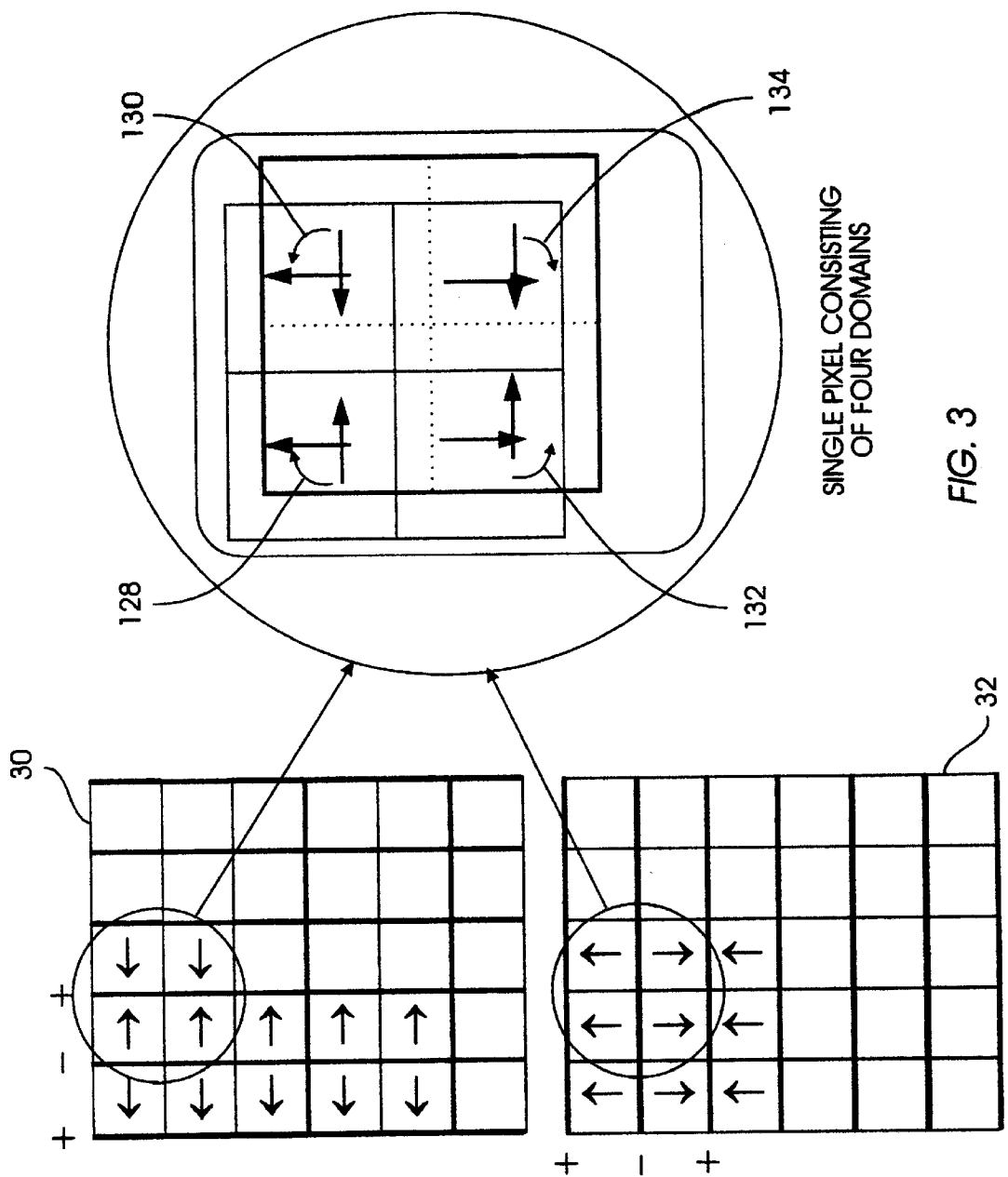
FIG. 3 provides a representation of the alignment directions on an alignment layer produced according to the subject invention, as well as a multi-domain pixel in a liquid crystal display device produced from the alignment layer.

Two panels, 30 and 32 as shown in FIG. 3, are prepared according to the process described in B above. A liquid crystal display is produced from the two panels with a chiral liquid crystal according to methods known in the art, as summarized above and disclosed in the numerous patent references incorporated herein by reference at various locations throughout this application. The resultant liquid crystal display is characterized by having a color cell of each pixels 34 divided into four domains, 128, 130, 132 and 134, where the liquid crystal orientation in each domain differs.

It is evident from the above results and discussion that improved methods of producing multi-domain liquid crystal displays are provided. In the subject methods, no complicated mechanical alignment steps, such as rubbing, are employed. Furthermore, complicated mask processes are also not employed. As such, the subject methods provide for relatively simple and effective means of producing alignment layers capable of giving rise to multi-domain liquid crystal displays.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. A method of producing a multi-domain alignment layer, said method comprising:

bombarding an alignment film present on the surface of a substrate with ions of normal incidence in the presence of an electrical field that deflects said ions in a manner sufficient for said ions to impinge on said alignment film at non-normal incidence;

whereby said alignment layer is produced.

2. The method according to claim 1, wherein said electrical field is generated by an array of parallel conducting means.

3. The method according to claim 2, wherein said method further comprises applying a different voltage to at least two different conducting means of said array.

4. The method according to claim 3, wherein said different voltage is applied in a manner sufficient for an array of parallel conducting means of alternating bias to be produced.

5. The method according to claim 2, wherein said array is part of a panel plate comprising said alignment film and said substrate.

6. The method according to claim 2, wherein said array is separate from a panel plate comprising said alignment film and said substrate.

7. A method of producing a multi-domain alignment layer, said method comprising:

directing an initial ion beam in a single trajectory from an ion beam source towards an alignment film present on the surface of a substrate; and generating an electric field between the ion beam source and the alignment film using an array of parallel alternatively biased conducting means effective to deflect the initial ion beam into a plurality of ion beams each having a different trajectory, such that said plurality of ion beams impinges on the alignment film, whereby said multi-domain alignment layer is produced.

8. The method according to claim 7, wherein said array is part of a panel plate comprising said alignment film and said substrate.

9. The method according to claim 7, wherein said array is separate from a panel plate comprising said alignment film and said substrate.

10. The method according to claim 7, wherein said conducting means is selected from the group consisting of wires of a conducting material and stripes of a conducting material.

11. A method of producing a multi-domain alignment layer, said method comprising:

bombarding an alignment film present on the surface of a substrate with ions of normal incidence in the presence of an array of parallel alternatively biased conducting means, wherein said array is part of a panel plate comprising said alignment film and said substrate;

whereby said alignment layer is produced.

12. The alignment layer produced according to the method of claim 1.

13. The alignment layer produced according to the method of claim 7.

14. The alignment layer produced according to claim 11.

15. A liquid crystal display comprising the alignment layer according to any one of claims 12 to 14.

16. In a method of producing a liquid crystal display, the improvement comprising:

incorporating said alignment layer according to any one of claims 12 to 14 into said liquid crystal display.

17. A method of producing a multi-domain liquid crystal display, said method comprising:

(a) producing first and second substrates each comprising an alignment layer on their surface, wherein said alignment layer is produced according to the method of claim 1;

(b) positioning said first and second substrates relative to each other in a manner sufficient to produce four different domains in each pixel of said display; and (c) introducing a liquid crystal material between said first and second substrates;

whereby said multi-domain liquid crystal display is produced.

* * * * *